United States Patent Office 3,365,514
Patented Jan. 23, 1968

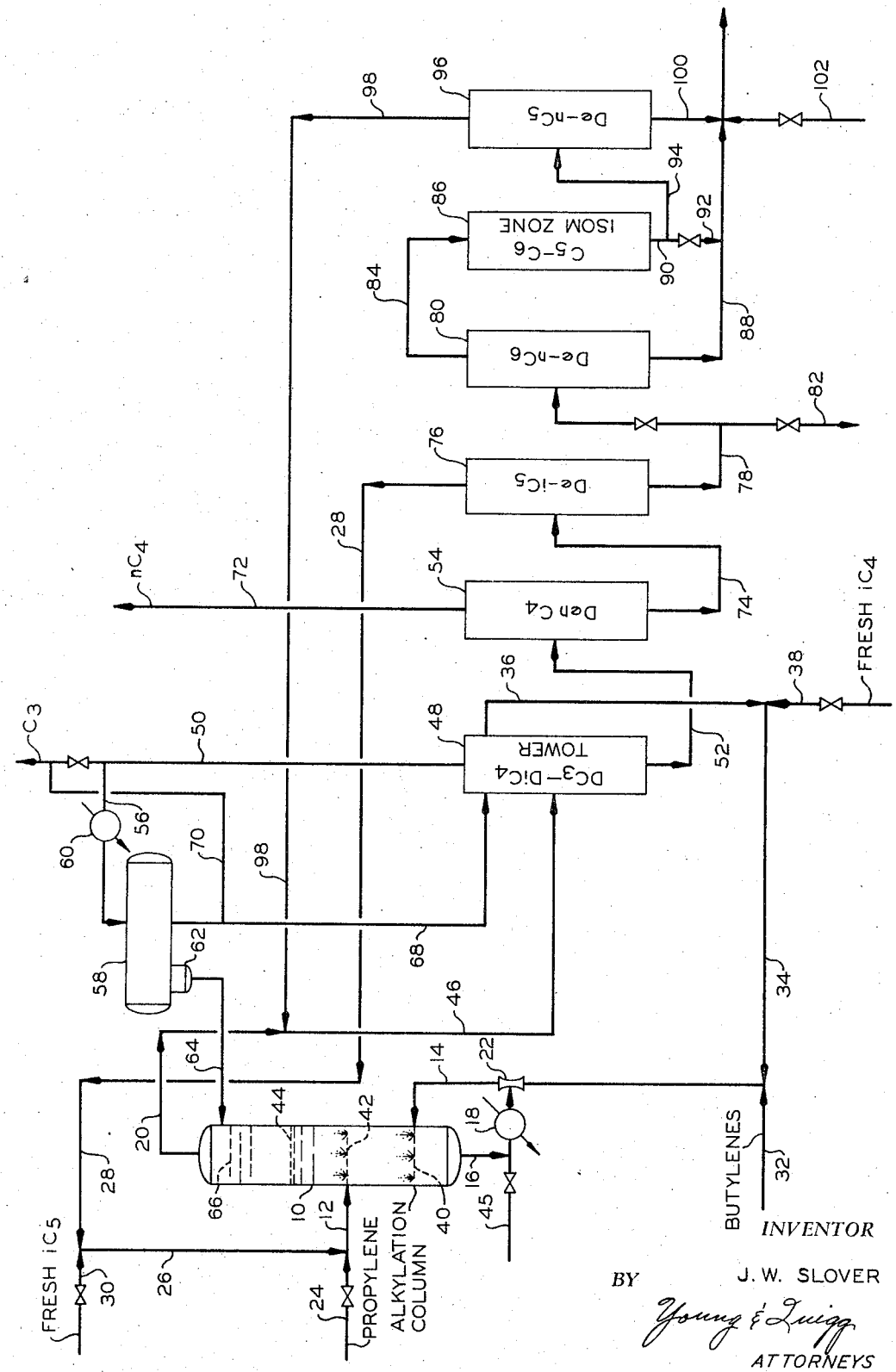

3,365,514
ALKYLATIONS AT DIFFERENT LEVEL ZONES IN LIQUID HF CATALYST
James W. Slover, Phillips, Tex., assignor to Phillips Petroleum Company, a corporation of Delaware
Filed May 14, 1965, Ser. No. 455,723
10 Claims. (Cl. 260—683.48)

ABSTRACT OF THE DISCLOSURE

An alkylation process is effected in which a mass of liquid HF catalyst is maintained within an alkylation column to provide a liquid level of catalyst therein. Isobutane is alkylated with butylenes in a lower section of said mass at a suitable temperature therefor, isopentane and isobutane are alkylated with propylene in an upper section of said mass at a normally higher temperature than in said lower section. Acid is removed from said mass, cooled, and recycled thereto to control the temperature in said mass and the resulting alkylates are recovered from said column above the acid level therein. In the operation, the different alkylation reactions are effected at temperatures most suitable therefor, utilizing the naturally increasing temperature along the line of flow through the column due to the exothermic nature of the reaction.

---

This invention relates to a process and apparatus for alkylating isobutane with butylenes and isopentane and isobutane with propylene.

In refinery operations it is preferred to react all of the available butylenes with isobutane to produce high octane alkylate utilizing relatively low temperatures (water cooling temperatures). However, isobutane is in relatively short supply while propylene is available in excess. The supply of isopentane is plentiful and isopentane has a high octane rating but it also has a higher vapor pressure (20 p.s.i.a. at 100° F.). Hence, isopentane can be used for motor fuel blending only in limited quantities. Additional alkylate can be produced from propylene and isopentane and this resulting alkylate can readily be blended with motor fuel without unduly raising the vapor pressure. The alkylate produced from isobutane-propylene is of somewhat lower octane (ASTM clear of about 89.5) than the alkylate produced from isobutane-butylenes (ASTM clear of about 93.6) and the octane of the alkylate produced from propylene-isopentane is the lowest (ASTM clear of about 75.0). However, reacting isopentane with propylene, even producing a relatively low octane material for blending, does increase the quantity of gasoline or motor fuel and allows even additional high vapor pressure isopentane to be blended back into the motor fuel total product.

Accordingly, it is an object of the invention to provide an improved process for alkylating isobutane with butylenes and isopentane and isobutane with propylene. Another object is to provide an arrangement of apparatus for effecting this alkylation process. A further object is to provide a process for effecting an alkylation process in separate lower and higher zones in a single upright alkylation column with most favorable temperatures in these zones for the different alkylation reactions. It is also an object of the invention to provide an alkylation process for alkylating isobutane with butylenes and isopentane and isobutane with propylene in a single alkylation column which simplifies the recovery steps for separating the alkylation effluent into its respective components. Other objects of the invention will become apparent to one skilled in the art upon consideration of the accompanying disclosure.

A broad aspect of the invention comprises conducting the alkylation of isobutane with butylenes in a lower level zone in an upright alkylation column at a temperature in the range of 60 to 100° F. in admixture with liquid HF, flowing the resulting alkylate and unreacted isobutane upwardly thru the column which is maintained liquid full, feeding isopentane and propylene into the upper level zone in the column into initial contact with the HF acid therein so as to produce isopentane-propylene alkylate and isobutane-propylene alkylate from the unreacted isobutane from the lower level zone, and separately recovering alkylate, unreacted isopentane and unreacted isobutane from the alkylation column effluent. The isopentane and isobutane are fed to the column in substantial molar excess with respect to the propylene and butylenes, respectively. The ratio of isobutane to butylenes is maintained in the range of about 5:1 to 10:1, while the ratio of isopentane to propylene is maintained in a ratio in the range of 3:1 to 10:1 (mol ratios).

The most efficient temperature for reacting isobutane with butylenes is in the range of about 60 to about 100° F. and specifically about 85° F., while the optimum temperature for alkylation of isopentane with propylene is in the range of about 95–130° F. and specifically about 110° F. Since the alkylation reaction is exothermic, the temperature in the column increases upwardly therein. With a substantial stoichiometric excess of isobutane, substantially all of the butylenes are reacted with the isobutane in a restricted zone in the lower section of the reactor or alkylation column. The highest temperature in this zone is produced in the top thereof as the resulting alkylate and unreacted isobutane pass upwardly thru the column. The temperature is further increased in the upper level alkylation zone which begins at the level of introduction of the propylene and isopentane into the acid in the column, the exothermic alkylation in the upper zone contributing further heat to the reaction mixture. The temperature of the column is controlled in the separate alkylation zone by cooling the HF acid fed to the column. A convenient method of operation comprises continually withdrawing a liquid stream of acid from the bottom of the column, heat exchanging the withdrawn stream with water at lowest available temperature, and injecting the cooled acid stream into the column at a higher level below the upper level reaction zone therein. A preferred method comprises injecting or pumping the mixed isobutane and butylenes thru an eductor which is connected with the acid recycle line downstream of the heat exchanger therein so as to educt the acid into the hydrocarbon fed to the lower zone.

There is a substantial octane advantage in alkylating isobutane with butylenes at the lower temperatures and isopentane with propylene at the higher temperatures in the aforesaid ranges. In other words, when all of these reactants are fed into the bottom of an alkylation column in admixture with HF acid at the best selected operating temperature so that all of the alkylation reactions are proceeding simultaneously in the same section of the reactor, a substantially lower octane alkylate is produced than the octane of the resulting total alkylate from the process of this invention.

Another feature of the invention comprises dehexanizing the resulting alkylate after removal of lighter material such as propane, n-butane, isopentane, and isobutane, isomerizing the lower octane dimethyl butanes thus recovered to produce higher octane methyl pentanes which is advantageously added to the alkylate to produce additional motor fuel. Another aspect of the invention comprises recovering isopentane and n-pentane from the isomerizate before blending the isomerized material with the alkylate.

A more complete understanding of the invention may be had by reference to the accompanying schematic flow drawing of an alkylation plant operation in accordance with the invention.

Referring to the drawing, an alkylation column or reactor 10 is provided with a feed line 12 for propylene and isopentane, a feed line 14 for isobutane, butylenes, and HF acid, an HF acid withdrawal line 16 containing an indirect heat exchanger 18, and an effluent line 20. An eductor 22 in line 14 effects eduction of acid from line 16 into the feed stream in line 14. Propylene from line 24 and isopentane from line 26 are fed into line 12. A portion of the isopentane comes from recycle line 28 and the balance from fresh isopentane feed line 30. Likewise, butylenes from line 32 and isobutane from line 34 are fed into line 14 in the desired proportions. The isobutane is supplied from recycle line 36 and from fresh isobutane feed line 38.

The alkylation reaction of isobutane with butylenes commences in line 14 because of the admixture of both reactants with recycle acid in this line and the reaction is substantially completed at a level in column 10 above distributor 40 and substantially below distributor 42. Reaction of both isobutane and isopentane with propylene is initiated as the feed from line 12 contacts the acid and the up-flowing isobutane in the reaction product from the lower level alkylation zone. The reaction of the isoparaffins with propylene is substantially completed before the reactants reach the acid level 44.

Fresh acid is added to the system thru line 45. Column 10 functions as a settling zone because of the substantially higher specific gravity of the HF acid than the lighter hydrocarbons and alkylate so as to maintain a distinct acid phase having a level 44 thru which the reactants and reaction products flow to outlet line 20. The acid level is controlled by addition of acid thru line 45 as needed.

It is also feasible to operate the alkylation column by feeding cooled acid into the bottom section of the column and withdrawing all acid along with alkylate and unreacted isoparaffins thru line 20. This requires a separate settling chamber for phase separation of the acid from the hydrocarbon material and an acid recycle line from the bottom of the settler to the bottom of the alkylation column with cooling means therein. However, the arrangement illustrated, utilizing column 10 as both the reactor and a settler, is preferred because it is simpler and more economical.

The effluent in line 20 comprising alkylate and unreacted isoparaffins is passed into line 45 for passage into tower 48 which functions as a depropanizer and deisobutanizer, the propane being taken off overhead thru line 50, the isobutane being taken off thru line 36, and the remaining alkylate stream being taken off as a bottoms product thru line 52 for passage to tower 54. The isobutane in line 36 is recycled as indicated above. The overhead stream in line 50 contains principally propane with traces of HF acid. Any selected portion or all of this stream may be taken off thru line 56 and passed to phase separator 58 after cooling in heat exchanger 60. The acid accumulates in leg 62 and is passed thru line 64 into the upper section of column 10 where it is forced into intimate contact with the alkylate stream by means of the baffles 66. In the alkylation reaction trace quantities of organic fluorides are formed which are destroyed by contact with the acid fed thru line 64. Cold propane is passed from settler 58 thru line 68 as reflux into tower 48 in any desired quantity. Excess propane is passed thru line 70 into line 50 downstream of the valve therein.

Normal butane is recovered as an overhead stream from tower 54 thru line 72 and the remaining alkylate is withdrawn as a bottoms product and passed thru line 74 to tower 76. Tower 76 is operated as a deisopentanizer with the isopentane being recovered as an overhead product and passed thru line 28 as recycle to line 26 and column 10. The substantially deisopentanized alkylate is recovered as a bottoms product and passed thru line 78 to tower 80 or it is recovered thru line 82 as alkylate without further separation for use as motor fuel with or without further blending. Column 80 is operated to recover the hexanes in the alkylate as an overhead product thru line 84 for passage to an isomerization reactor 86. The dehexanized alkylate is recovered as a bottoms product thru line 88. Isomerization reactor 86 is operated in conventional manner with a selected catalyst so as to isomerize at least a substantial proportion of the dimethyl butanes to methyl pentanes which has a substantially better octane rating and is more desirable as a constituent of the alkylate. This isomerizate is passed thru line 90 either into the alkylate thru line 92 into line 88 or thru line 94 into tower 96 which is operated as a depentanizer to remove minor amounts of normal and iso-

TABLE

[Volumes in barrels/day]

| Component | Propylene Feed (24) | Butylenes Feed (32) | Fresh iC₄ (38) | Fresh iC₅ (30) | DiC₅ OHD (28) | iC₄ Recycle (36) | Total to Reactor | Reactor Effluent (20) | DnC₅ OHD (98) | Feed to DC₃-DiC₄ (46) | Propane Yield (50) |
|---|---|---|---|---|---|---|---|---|---|---|---|
| Propylene | 500 | | | | | | 500 | | | | |
| Butylenes | | 1,000 | | | | | 1,000 | | | | |
| Propane | 25 | | | | | | 25 | 40 | | 40 | 40 |
| Isobutane | | | 1,300 | | | 7,800 | 9,100 | 7,800 | | 7,800 | |
| Normal Butane | | 200 | 100 | | | | 300 | 300 | | 300 | |
| Isopentane | | | | 200 | 50 | | 250 | 50 | 50 | 100 | |
| Normal Pentane | | | | 25 | | | 25 | 100 | 50 | 150 | |
| Methyl Pentanes | | | | | | | | 120 | | 120 | |
| Dimethyl Butanes | | | | | | | | 130 | | 130 | |
| C₇+ Gasoline | | | | | | | | 2,200 | | 2,200 | |
| Total | 525 | 1,200 | 1,400 | 225 | 50 | 7,800 | 11,200 | 10,740 | 100 | 10,840 | 40 |

| Component | Feed to DnC₄ (52) | nC₄ Yield (72) | Feed to DeiC₅ (74) | DiC₅ BTMS (78) | DeC₆ OHP (84) | DeC₆ BTMS (88) | Isom Reactor Ef. (90) | DnC₅ BTMS (100) | Blend (100+88) | Blend (100+88+102) | Line 102 |
|---|---|---|---|---|---|---|---|---|---|---|---|
| Propylene | | | | | | | | | | | |
| Butylenes | | | | | | | | | | | |
| Propane | | | | | | | | | | | |
| Isobutane | | | | | | | | | | | |
| Normal Butane | 300 | 300 | | | | | | | | | |
| Isopentane | 100 | | 100 | 50 | 50 | | 70 | 20 | 20 | 230 | 210 |
| Normal Pentane | 150 | | 150 | 150 | 150 | | 130 | 80 | 80 | 90 | 10 |
| Methyl Pentanes | 120 | | 120 | 120 | 120 | | 190 | 190 | 190 | 190 | |
| Dimethyl Butanes | 130 | | 130 | 130 | 130 | | 60 | 60 | 60 | 60 | |
| C₇+ Gasoline | 2,200 | | 2,200 | 2,200 | | 2,200 | | | 2,200 | 2,200 | |
| Total | 3,000 | 300 | 2,700 | 2,650 | 450 | 2,200 | 450 | 350 | 2,550 | 2,770 | 220 |
| Ron w/3 cc | | | | 101.5 | | 102.0 | | | 102.5 | 104 | | pentane thru line 98 for recycle to line 45. The depentanized isomerizate is then passed as a bottoms product thru line 100 into line 88 where it is mixed with the product alkylate. Isopentane, which has a relatively high octane rating and high vapor pressure is introduced to the alkylate in line 88 thru line 102 when the condition of the alkylate permits this blending without unduly raising the vapor pressure of the alkylate, to improve the octane number thereof.

The various distillation columns shown are operated in known manner to effect the desired separations. The details of these columns, various pumps, valves, reboilers, etc., required are conventional in the art and one skilled in the art will understand the invention without specific disclosure of these details.

Operation in accordance with the invention is illustrated in the material balance presented in the preceding table. The table clearly demonstrates several of the advantages of the invention.

Certain modifications of the invention will become apparent to those skilled in the art and the illustrative details disclosed are not to be construed as imposing unnecessary limitations on the invention.

I claim:

1. A process for simultaneously alkylating isobutene with butylenes and isopentane with propylene in a single upright alkylation column which comprises the steps of:
   (1) maintaining a mass of liquid HF catalyst in said column to provide a liquid level of said catalyst therein;
   (2) introducing into a lower level of said mass of catalyst a liquid stream of isobutane and butylenes in a volume ratio of isobutane to butylenes in the range of about 5:1 to 10:1 so as to react substantially all of said butylenes with isobutane, the resulting alkylate and unreacted isobutane passing upwardly thru said column;
   (3) introducing into a higher level of said mass of catalysts at which the reaction of step (2) is substantially completed, a liquid stream of isopentane and propylene in a volume ratio in the range of 3:1 to 10:1, so as to react substantially all of said propylene with isopentane and remaining isobutane below said acid level, the resulting alkylate and unreacted isopentane passing upwardly thru said column;
   (4) controlling the temperature of the acid of step (1) by continuously cooling same to compensate for exothermic heat of reaction in steps (2) and (3) so as to maintain a temperature in step (2) in the range of 60–100° F. and a substantially higher temperature in step (3) in the range of 95 to 130° F.;
   (5) withdrawing effluent alkylate and unreacted isobutane and isopentane from a substantial liquid mass of these materials in said column above the acid level therein; and
   (6) recovering alkylate from the effluent of step (5).

2. The process of claim 1 wherein step (4) comprises continuously withdrawing a stream of acid from the bottom of said column, cooling said stream, and injecting the cooled stream into the lower part of said column.

3. The process of claim 1 wherein the effluent of step (5) contains a few parts per million of organic fluorides and a minor concentration of HF and including the steps of:
   (7) recovering said HF from said effluent; and
   (8) intimately contacting the liquid in said column above said acid level therein with the recovered HF.

4. The process of claim 1 wherein step (6) comprises:
   (7) separately recovering from said effluent, propane- and-lighter materials and isobutane in a first fractionation step;
   (8) recovering n-butane from the remaining alkylate of step (7); and
   (9) recovering isopentane from the remaining alkylate of step (8); and further comprising the steps of:
   (10) recycling recovered isobutane of step (7) to step (2); and
   (11) recycling recovered isopentane of step (9) to step (3).

5. A process for simultaneously alkylating isobutane with butylenes and isopentane with propylene in a single upright alkylation column in lower and higher level zones, respectively, therein at different temperatures conducive to efficient alkylation of the respective materials, which comprises the steps of:
   (1) feeding a stream of liquid HF into said column below said lower level zone at a temperature below alkylation temperature;
   (2) feeding a mixed stream of isobutane and butylenes in a ratio in the range of 5:1 to 10:1, respectively, into said lower level zone and intimately mixing same with said HF so as to effect substantially complete conversion of butylenes therein;
   (3) feeding a mixed stream of isopentane and propylene in a ratio in the range of 3:1 to 10:1, respectively, into said upper level zone and intimately mixing same with said HF and reaction effluent from step (2) so as to effect substantially complete conversion of propylene;
   (4) maintaining liquid-phase conditions throughout said column with a liquid level of HF catalyst phase at said upper level zone;
   (5) controlling the flow rates and temperatures of the feeds in steps (1), (2), and (3) so as to maintain alkylation temperatures in the lower level zone in the range of 60 to 100° F. and in the upper level zone at substantially higher temperatures in the range of 95 to 130° F.;
   (6) withdrawing an effluent stream from the upper end of said column; and
   (7) recovering separate streams of alkylate, isobutane, and isopentane from said effluent and recycling said isobutane and isopentane streams except alkylate, to their respective points of introduction thereto.

6. The process of claim 5 wherein the alkylate from step (7) contains n-hexane and further comprising the steps of:
   (8) separately recovering n-hexane from the alkylate from step (7);
   (9) isomerizing the n-hexane from step (8) to isohexane; and
   (10) blending the isohexane from step (9) with the alkylate from step (8).

7. The process of claim 5 wherein the alkylate from step (7) contains n-pentane, isopentane, and n-hexane and further comprising the steps of:
   (8) separately recovering n-hexane from the alkylate from step (7);
   (9) isomerizing the n-hexane from step (8) to isohexane; and
   (10) recovering n-pentane and isohexane from the effluent isomerizate from step (9) and recycling same to recovery step (7).

8. The process of claim 5 wherein unreacted isobutane flows from said lower level zone to said higher level zone and is reacted with propylene in said higher level zone.

9. The process of claim 8 wherein a liquid stream of HF is withdrawn from the bottom of said column and cooled by indirect heat exchange, and a mixed stream of isobutane and butylene is passed thru an eduction zone so as to educt the cooled stream of HF thereinto and injecting the resulting stream into the bottom of said lower level zone.

10. The process of claim 8 including the step of:
    (8) blending a substantial proportion of isopentane with the resulting alkylate.

(References on following page)

References Cited

UNITED STATES PATENTS

| | | | |
|---|---|---|---|
| 2,276,171 | 3/1942 | Ewell | 260—683.49 X |
| 2,436,483 | 2/1948 | Newman | 260—683.49 X |
| 3,169,153 | 2/1965 | Walker et al. | 260—683.48 |
| 3,254,137 | 5/1966 | Hutto et al. | 260—683.48 |

DELBERT E. GANTZ, *Primary Examiner.*

G. J. CRASANAKIS, R. H. SHUBERT,
*Assistant Examiners.*